United States Patent [19]

Cipriani et al.

[11] 4,379,197
[45] Apr. 5, 1983

[54] STRETCH WRAP FILM COMPOSITION

[75] Inventors: Cipriano Cipriani, Morristown; Henry J. Boyd, Laurence Harbor, both of N.J.

[73] Assignee: El Paso Polyolefins Company, Paramus, N.J.

[21] Appl. No.: 326,716

[22] Filed: Dec. 2, 1981

[51] Int. Cl.³ .............................................. B32B 7/02
[52] U.S. Cl. .................................. 428/220; 524/317
[58] Field of Search .............. 428/220, 515, 354, 355, 428/516; 524/317, 585, 310; 526/348.1, 348.2, 348.3, 348.4, 348.5, 348.6

[56] References Cited

U.S. PATENT DOCUMENTS

| T958,013 | 5/1977 | Ballard et al. | 526/348.2 |
| 4,073,782 | 2/1978 | Kishi et al. | 428/220 |
| 4,311,752 | 1/1982 | Diedrich et al. | 526/348.2 |
| 4,359,561 | 12/1982 | Fraser et al. | 526/348.2 |

Primary Examiner—Marion McCamish
Assistant Examiner—Beverly K. Johnson
Attorney, Agent, or Firm—Fred S. Valles; Margareta LeMaire

[57] ABSTRACT

Films especially useful for the stretch wrapping of pallet loads are prepared from compositions consisting essentially of a linear low density polyethylene resin free of any polymerized vinyl acetate groups and from about 0.3 to about 3.0 wt % sorbitan monooleate based on the weight of the resin.

10 Claims, No Drawings

STRETCH WRAP FILM COMPOSITION

BACKGROUND OF THE INVENTION

The use of compositions based on ethylene homopolymer or copolymers in the manufacture of stretch wrap films having good cling and optical properties is known, e.g., as shown in U.S. Pat. Nos. 4,073,782 and 4,222,913. U.S. Pat. No. 4,073,782 discloses stretch wrap films made from a ternary composition wherein the resin component is a polyethylene of any suitable density, a copolymer of ethylene and vinyl acetate, or a mixture of the above mentioned polyethylene and copolymer. The remaining essential components of the ternary composition are sorbitan monooleate, which is mainly added as an antihazing agent, and a liquid paraffin, as an adhesiveness modifier. When polyethylene is chosen as the resin component, the sorbitan monooleate concentration should range between about 0.5 to 2.0% based on the polyethylene weight. The liquid paraffin concentration should fall in the range of 0.5 to 6% of the polymer. If no liquid paraffin is used, a film produced from the resulting binary composition is exceedingly sticky and cannot be used as wrapping material. Although the films produced in accordance with the teachings of the aforementioned patent perform very well in most applications, their strength and toughness properties are somewhat inferior for use in stretch wrapping of pallet loads. U.S. Pat. No. 4,222,913 discloses improvement in these properties by the use of a resin which is a blend of ethylene-vinyl acetate copolymer with a copolymer of propylene and small amounts of ethylene.

The recently developed linear low density polyethylenes have the desired strength and toughness properties required for stretch wrap applications, but do not possess the required cling, which in the case of conventional polyethylene, can at least be partially obtained by incorporation of vinyl acetate as a comonomer.

It is, therefore, an object of the present invention to provide a composition from which films can be prepared having improved strength, toughness and cling properties.

It is another object to provide a composition suitable for manufacture of pallet wrap stretch films of superior cling quality which will function at both ambient and winter warehouse temperatures.

A further object is to provide stretch wrap films of improved properties. Other objects will become apparent from a reading of the specification and appended claims.

THE INVENTION

In accordance with the present invention there is provided a composition suitable for a stretch wrap film manufacture essentially consisting of:

(a) a linear low density polyethylene resin free of any polymerized vinyl acetate groups, and
(b) from about 0.3 to about 3.0 weight percent of sorbitan monooleate based on the weight of the resin. Preferably the sorbitan monooleate concentration is maintained in the range from about 0.7 to about 1.7 weight %.

Contrary to the findings of the prior art, the polyethylene composition of this invention does not require the presence of a liquid paraffin in order to prevent excessive stickiness or adherence of the resulting film to itself or to film processing equipment, e.g., during roll windoff.

The linear low density polyethylene (LLDPE) component of the composition of the invention is a copolymer of ethylene with one or more comonomers selected from $C_4$ to $C_{10}$ alpha olefins such as butene-1, hexene-1, etc. It has a density usually in the range of from about 0.900 to about 0.940 g/cc and preferably the density should be maintained between 0.916 to 0.928 g/cc for film making purposes. The melt index should range between about 0.1 and 10 g/10 min. and preferably between about 0.5 and about 3.0 g/10 min. Such polymer resins are commercially available and are manufactured in low pressure vapor phase and liquid phase processes using transition metal catalysts.

The sorbitan monooleate which is a commercially available viscous liquid, can be incorporated into the composition by any convenient method, e.g., by pumping it at a desired rate to the hopper of an extruder and coextruding the blend of LLDPE and sorbitan monooleate to form strands which upon cooling are chopped into pellets. Alternatively, the LLDPE resin in granular pellet form can be blended in the same manner with the sorbitan monooleate in the extruder used in the film forming process.

Various methods may be used for producing the film, e.g., by any of the known tubular blowing methods or by the so called chilled roll casting methods. The thickness of the film can be between about 0.2 and about 2 mil and should preferably be in the range of from about 0.3 to about 1.5 mil. Since the films of these invention have greater tear and puncture resistance, tensile strength and elongation compared to films prepared from conventional low density polyethylene or ethylene-vinyl acetate copolymers, the film thickness can be considerably reduced at equivalent stretch wrap performance. Because of the aforementioned desired properties, the films perform extremely well as stretch pallet wrap material. In addition, the films have generally good optical qualities such as low haze levels and high gloss, and are resistant to fogging and can, therefore, also be used with advantage for wrapping of food to be displayed or stored in refrigerated cases.

The following examples further illustrate the advantages of the invention:

EXAMPLE 1

1.2 parts sorbitan monooleate and 98.8 parts of LLDPE powder (7-8 wt % polymerized 1-butene, 0.916 density, 0.6 melt index) were thoroughly mixed in a ribbon blender and extruded into pellets, and, subsequently, blown into film using a 2½" Davis Screw Extruder having the fluted head screw connected to a 4" die having a die gap of 0.086". The die temperature was maintained at about 450° F., while the average barrel temperature was about 430° F. The line speed was 42 feet per minute. The film produced had a thickness of 1 mil. Table 1 shows the results of physical testing of the film.

Testing of this film at both room temperature and 37° F. showed excellent cling.

EXAMPLES 2-5

Using the materials and procedure described in Example 1 36" wide films were produced having thicknesses of 1.19 mil, 0.66 mil and 0.30 mil. 44" square pallets supporting four 21" diameter rolls of film set on end (36" high) were wrapped with each of the films.

The test procedure entailed wrapping the pallets at ever increasing tension until the film tore off and then backing off the tension to the point where good pallet wraps could be obtained. Resistance to tear propagation was measured by initiating a cut and timing tear propagation. Maximum tension settings, operating tension settings and resistance to tear propagation are presented in Table 2, which also shows the results of testing (Example 5) a conventional commercial ethylene-vinyl acetate copolymer stretch wrap film (12% VA).

The major difference between the films of Examples 2–4 vs. that of Example 5 was their resistance to tear propagation. The films of the present invention (Example 2–4) tore very slowly for a few seconds and stopped leaving a tight pallet, while the film of Example 5 zippered upon testing leaving a loose pallet.

Various modification and alterations can of course be made to the composition and films without departing from the scope of the invention, which is defined by the specification and appended claims.

TABLE 1

| | | |
|---|---|---|
| Haze[1], Total | | 13.7 |
| Internal | | 3.4 |
| Gloss[2], 45° | | 4.8 |
| 60° | | 6.5 |
| Dart Impact[3], g/mil | | 121 |
| Elmendorf Tear, g/mil MD[4] | | 131 |
| TD[5] | | 522 |
| Tensile Strength @ Yield[6], psi MD | | — |
| TD | | 1190 |
| Tensile Strength @ Break[6] MD | | 4580 |
| TD | | 2120 |
| % Elongation @ Break,[6] MD | | 357 |
| TD | | 521 |
| 1% Secant Modulus[6] psi MD | | $2.72 \times 10^4$ |
| TD | | $3.36 \times 10^4$ |

[1]ASTM D-1003
[2]ASTM D-2457
[3]ASTM D-1709
[4]MD - Machine Direction
[5]TD - Transverse Direction
[6]ASTM D-882

TABLE 2

| Ex. No. | Gauge | Max. Ten. | Run Ten. | T.D. Tear Time | Notes |
|---|---|---|---|---|---|
| 2 | 1.19 mil | 23% | 16% | 5–10 sec. | Excellent Tear. Very tight pallet. |
| 3 | .66 mil | 20% | 17% | 5–10 sec. | Excellent Tear. Very tight pallet. |
| 4 | .30 mil | 14% | 12% | 5–10 sec. | Excellent Tear. Very tight pallet, but looser than Ex. 3. |
| 5 | 1.05 mil | 23% | 20% | 1–3 sec. | Poor tear (Zipper effect). Normal pallet. |

What is claimed is:

1. A stretch wrap film composition consisting essentially of
   (a) a linear low density polyethylene resin free of any polymerized vinyl acetate groups said resin being a copolymer of ethylene with one or more comonomers selected from $C_4$ to $C_{10}$ alpha-olefins and having a density in the range of from about 0.900 to about 0.940 g/cc and a melt index between about 0.1 and 10 g/10 min. and
   (b) from about 0.3 to about 3.0 weight percent sorbitan monooleate based on the weight of the resin, said composition in film form having excellent cling properties without exhibiting excessive adherence to film processing equipment.

2. The composition of claim 1 wherein the concentration of sorbitan monooleate is maintained in the range from about 0.7 to about 1.7 weight percent.

3. The composition of claim 1 wherein said density is between about 0.916 and about 0.928 g/cc.

4. The composition of claim 1 wherein the melt index of the linear low density polyethylene ranges between about 0.5 and about 3.0 g/10 min.

5. A stretch wrap film having excellent cling properties without exhibiting excessive adherence to film processing equipment and having been prepared from a composition consisting essentially of
   (a) a linear low density polyethylene resin free of any polymerized vinyl acetate groups said resin being a copolymer of ethylene with one or more comonomers selected from $C_4$ to $C_{10}$ alpha-olefins and having a density in the range of from about 0.900 to about 0.940 g/cc and a melt index between about 0.1 and 10 g/10 min. and
   (b) from about 0.3 to about 3.0 weight percent sorbitan monooleate based on the weight of the resin.

6. The film of claim 5 wherein the concentration of sorbitan monooleate is maintained in the range from about 0.7 to about 1.7 weight percent.

7. The film of claim 5 wherein said density is between about 0.916 and about 0.928 g/cc.

8. The film of claim 5 wherein the melt index of the linear low density polyethylene ranges between about 0.5 and about 3.0 g/10 min.

9. The film of claim 5 having a thickness of from about 0.2 to about 2 mil.

10. The film of claim 9 wherein the thickness is from about 0.3 to about 1.5 mil.

* * * * *